United States Patent
Boesch et al.

[11] Patent Number: 5,822,547
[45] Date of Patent: Oct. 13, 1998

[54] METHOD AND APPARATUS FOR PROVIDING A PORTABLE COMPUTER WITH HOT PLUGGABLE MODULAR BAYS

[75] Inventors: Shannon C. Boesch, Georgetown; Charles L. Haley, Temple, both of Tex.

[73] Assignee: Texas Instruments Incorporated, Dallas, Tex.

[21] Appl. No.: 656,799

[22] Filed: May 31, 1996

[51] Int. Cl.⁶ .................................................. H01J 13/00
[52] U.S. Cl. ........................ 395/283; 395/281; 395/868; 395/287
[58] Field of Search .................................... 395/281, 282, 395/283, 287, 306, 308, 309, 822, 868, 869, 250, 851, 853, 500; 361/683, 686; 364/708.1

[56] References Cited

U.S. PATENT DOCUMENTS

| | | | |
|---|---|---|---|
| 5,041,924 | 8/1991 | Blackborow et al. | 360/69 |
| 5,157,771 | 10/1992 | Losi et al. | 395/282 |
| 5,305,180 | 4/1994 | Mitchell et al. | 361/685 |
| 5,483,419 | 1/1996 | Kaczeus, Sr. et al. | 361/685 |
| 5,530,302 | 6/1996 | Hamre et al. | 307/147 |
| 5,579,491 | 11/1996 | Jeffries et al. | 395/283 |
| 5,598,537 | 1/1997 | Swanstrom et al. | 395/281 |

FOREIGN PATENT DOCUMENTS 0 552 873 A1  7/1993  European Pat. Off. .

OTHER PUBLICATIONS

"Circuits To Allow Cartridge Hot–Plugging", *IBM Technical Disclosure Bulletin*, vol. 29, No. 7, Dec. 1986, pp. 2877–2878.

*Primary Examiner*—Ayaz R. Sheikh
*Assistant Examiner*—Raymond N. Phan
*Attorney, Agent, or Firm*—Bret J. Petersen; Ronald O. Neerings; Richard L. Donaldson

[57] ABSTRACT

A computer system 10, such as a notebook computer, uses a modular bay 12 to receive optional devices 14. Buffer circuits 36 selectively isolate the device 14 in the modular bay from respective buses 34. An SMI handler, or similar executable routine, recognizes events which affect the modular bay 12 (such as insertion or removal of a device 14 from the modular bay 12), and performs the necessary routines to re-enumerate the system so that the device 14 is properly connected to its bus 34 and that the system software is aware of the hardware connected to computer 10.

9 Claims, 3 Drawing Sheets

METHOD AND APPARATUS FOR PROVIDING A PORTABLE COMPUTER WITH HOT PLUGGABLE MODULAR BAYS

BACKGROUND OF THE INVENTION

1. Technical Field

This invention relates in general to computers and, more particularly, to modular bays in a portable computer.

2. Description of the Related Art

For many years, the popularity of portable computers has risen as the size and weight of the portable computer has been reduced. Early portable computers were known as "luggable" computers, since they could be transported, but were only slightly smaller and lighter than comparable desktop computers. "Laptop" computers were smaller and lighter, but generally had reduced features and flexibility because most of the circuitry needed to be designed into the laptop motherboard without the option of expansion boards.

"Notebook" computers are significantly smaller and lighter than laptop computers. These computers can be carried easily in a briefcase. Because of their size, it is possible to accommodate only a limited number of data drives, whereas a given user may want any combination of CD-ROM (compact disk read-only memory) drives, hard drives, floppy drives, MO (magneto-optical) drives, and so on. Future technologies, such as DVD (digital versatile drives), will increase the number of mass storage options. Often, it is convenient to use the bay for a high density media drive while working in applications and switch to other types of drives, such as floppy drives, for specific purposes, such as loading new programs.

Accordingly, there is a growing trend in the industry to provide modular bays into notebook designs. Bays are externally accessible slots designed into the notebook to allow the insertion of a variety of devices such as the drives specified above. Further, it is sometimes desirable for the bay to accommodate a second battery.

Due to size considerations, it is difficult to design a notebook computer with two drives in addition to the computer's internal hard drive. Therefore, many manufacturers have chosen to have a bay allowing the user to interchange CD-ROM and floppy drive modules. A major problem in providing hot pluggable devices (devices which can be interchanged while the computer is powered), however, is the effect which the removal and insertion of devices can have upon the internal system buses. For example, the IDE (integrated drive electronics) data bus is shared with the internal hard drive of the computer and, therefore, adding a CD-ROM which uses the IDE bus could corrupt data on the IDE bus while transfers are occurring in the notebook, causing data errors.

Accordingly, in order to switch devices in current day bays, the computer must be turned off to switch drives in a present day computer. When power is restored to the computer, the system software determines which device is in the bay and configures the system accordingly. However, rebooting the computer can be time consuming and frustrating. First, with multitasking operating systems and operating environments, the user is likely to have many applications open, and have multiple documents open in each application, which will require significant work to reconstruct the state of the computer prior to power-down. Further, it takes a significant amount of time to load a modern operating system, such as WINDOWS 95 by Microsoft Corporation of Redmond, Wash. In short, problems associated with rebooting the computer to change devices in the bay often overshadows the convenience of switchable devices in an bay.

An alternative to conventional bays is an intelligent slot such as a PCMCIA (Personal Computer Memory Card International Association) device, also known as a PC Card device, which uses a standardized protocol. These devices have certain drawbacks, however; the devices require special logic built in to each device to communicate with a controller inside the computer and therefore are not compatible with use of off-the-shelf parts and are significantly more expensive. MICROSOFT has proposed a WINDOWS 95 specification for hot pluggable devices for notebook computer bays which also requires special intelligence built into the replaceable devices—this proposal would also incur the problems with cost and compatibility stated above.

Therefore, a need has arisen in the industry for a method and apparatus for providing hot pluggable devices to a portable computer which does not result in data errors.

SUMMARY OF THE INVENTION

To provide devices which may be switched while the computer remains powered, the computer system of the present invention has system processing circuitry coupled to a connector for receiving a device through a plurality of buses. Buffer circuitry selectively isolates the connector from one or more of said buses.

The present invention provides significant advantages over the prior art. Devices may be inserted and removed from a bay while the computer remains powered, since the buses are protected from inadvertent data associated with the device switching by the buffers. In the preferred embodiment, devices do not require any special internal logic circuitry, thereby allowing off-the-shelf components to be used with only minor additional hardware. Further, the connector pins are shared between multiple buses, thereby reducing the circuitry involved in providing the bay.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The present invention is best understood in relation to FIGS. 1–5 of the drawings, like numerals being used for like elements of the various drawings.

Figure 1:
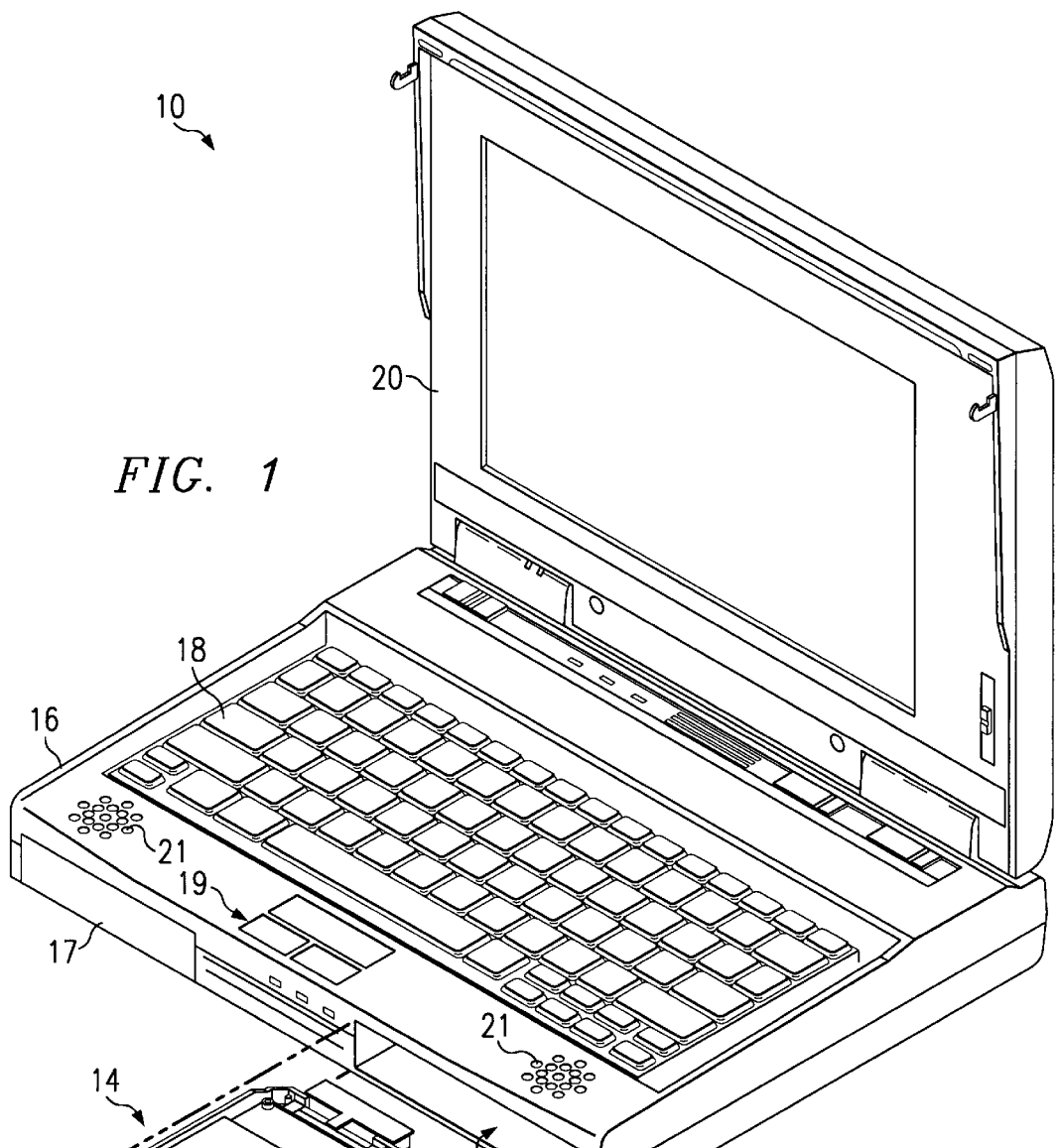
FIG. 1 illustrates a perspective view of a portable computer incorporating a modular bay according to the present invention.

FIG. 1 illustrates a perspective view of a computer system 10 having a modular bay 12 for receiving one of a plurality of modular devices 14, such as a floppy drive, hard disk drive, CD-ROM, magneto-optical (MO) drive, battery, or cellular telecommunication device. The computer system 10 includes a main housing 16, within which the computer electronics are housed. The modular bay 12 is accessible through the housing. A battery 17 is placed next to the modular bay 12. A keyboard 18 is placed at the top of the main housing 16. Keyboard 18, in the preferred embodiment, includes a pointing device, such as touch pad 19. A display 20 is attached to the main housing 16. Typically, the display 20 is connected to the main housing 16 by a hinge, such that the display 20 can be folded away from the main housing 16 when the computer 10 is in use and folded flush with the main housing 16 for portability when the computer 10 is inactive. For a multimedia computer, speakers 21 are shown as provided in the main housing 16.

While FIG. 1 illustrates a specific notebook computer design, it should be noted that many modifications could be made. For example, many different pointing devices could be used, such as a mouse, a trackball or an integrated joystick. Other features, such as speakers, are optional and not needed to practice the present invention, as would be known to one skilled in the art. The arrangement of the components of the computer could also be modified by the system designer.

Figure 2:
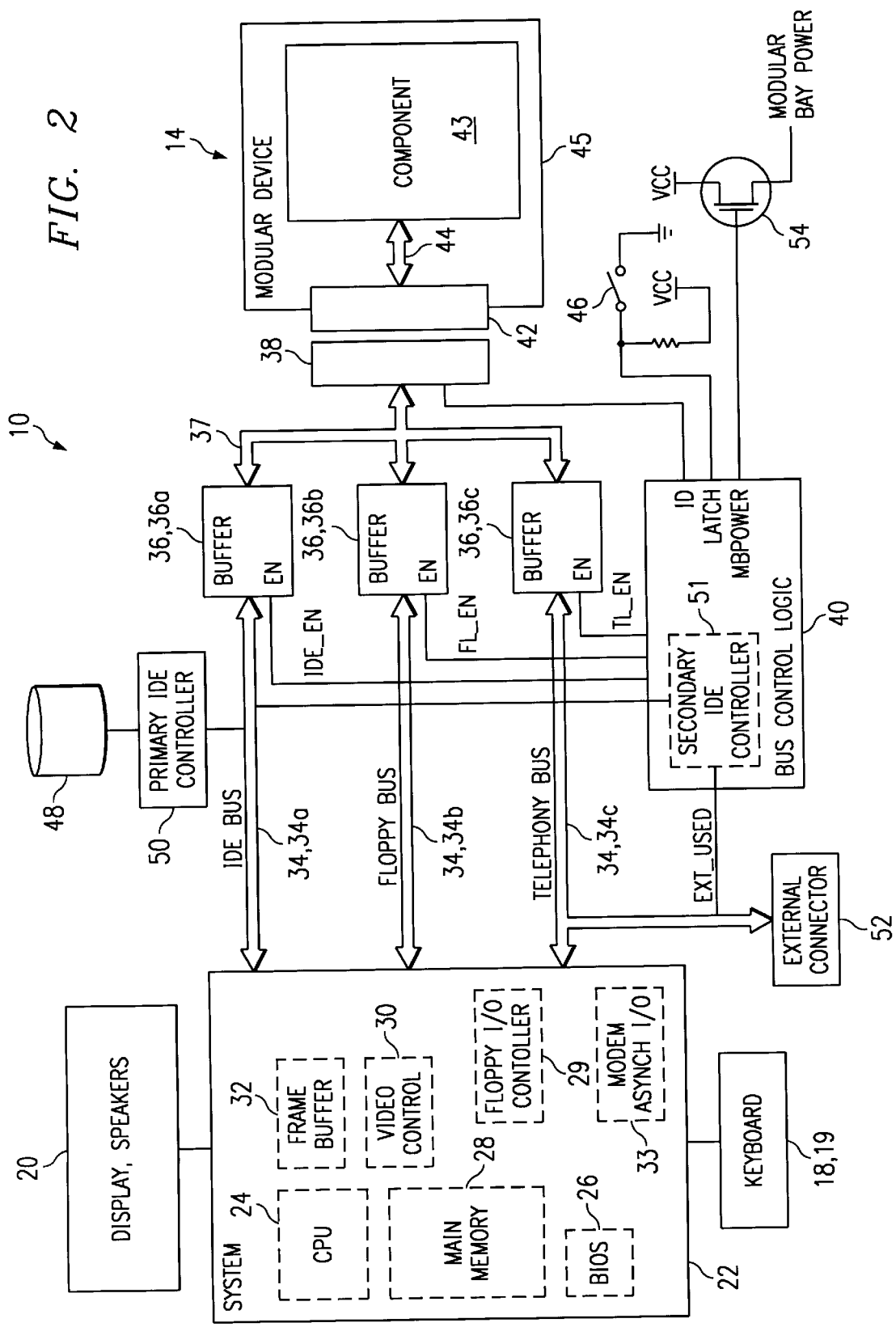
FIG. 2 illustrates a block diagram of a preferred embodiment of the circuitry of the computer of FIG. 1.

In operation, the modular devices 14 each include a connector which connects to a corresponding connector disposed in the back of the modular bay 12 (see FIG. 2). For example, a standard 80-pin connector can be used to electrically couple the modular device 14 with the system electronics of the computer. To ensure a reliable connection, a mechanical latch (not shown) holds the modular device 14 in the modular bay 12 once the modular device 14 is fully seated in the bay.

Importantly, the modular devices 14 can be switched while the computer is powered, so long as the operating system can be instructed to re-enumerate the system. This aspect of the invention is discussed in greater detail in connection with FIGS. 2 and 3.

Another important feature of the present invention is that off-the-shelf parts can be used in the modular devices. As will be discussed in greater detail hereinbelow, the modular device comprises either a proprietary or off-the-shelf device which is housed in a housing which fits in the modular bay 12.

FIG. 2 illustrates a block diagram of the computer system 10. The system processing circuitry 22 includes, in part, a central processing unit (CPU) 24, a system BIOS 26, main memory 28, floppy controller 29, video/graphics controller 30, frame buffer 32 and modem 33 (including asynchronous I/O circuitry). The system processing circuitry 22 communicates with the keyboard 18 and the display 20. In connection with the modular bay 12, there are three buses 34 coupled between the system processing circuitry 22 and the modular bay 12, referenced individually as the IDE bus 34a, the floppy bus 34b and the telephony bus 34c. Each of the buses 34 is coupled to a respective buffer 36, referenced individually as buffers 36a–c. The buffers 36 couple the buses 34 to shared bus 37. Shared bus 37 is connected to connector 38, which is disposed in the modular bay 12.

Bus control circuitry 40 individually controls whether each of the buffers 36a–c are in a high impedance state or a low impedance state through control signals IDE_EN (to buffer 36a), FL_EN (to buffer 36b) and TL_EN to buffer 36c. When a buffer 36 is in a high impedance (disabled) state, it does not allow electrical communication between its respective bus 36 and the connector 38. When the buffer is in a low impedance (enabled) state, signals can pass freely between its respective bus 36 and the connector 38.

Each modular device 14 includes a connector 42, which mates with connector 38. The connector 42 is coupled to a component 43 through cable 44. The component 43 can be any device, proprietary or off-the-shelf, such as a data drive (hard drive, floppy drive, MO drive, CD-ROM drive, DVD drive, for example) or other electronic circuit (cellular transmission device or modem, for example). Each modular device 14 is associated with an identification code which, in the preferred embodiment, is a four bit code. The code, which is discussed in greater detail below, is passed to the ID pins of bus control logic 40.

The housing 45 of the modular device 14 contains the component 43 and slides into the modular bay 12. A latch (not shown) is provided in the modular bay 12 to secure a device 14 in the modular bay 12 when the device is fully inserted. A switch 46 has a terminal 46a coupled to ground when the device 14 is latched in the modular bay 12 and floating when the modular bay is not latched. Terminal 46a is coupled to $V_{cc}$ through pull up resistor 48. Terminal 46a is coupled to the LATCH pin of bus control logic 40. Hence, the LATCH pin is at a logical high state when there is not a device latched in the modular bay 12, and is at a logical low when a device is latched in the modular bay 12.

Typically, the notebook computer will include an internal hard drive 48 or other mass storage device. The internal hard drive 48 is coupled to the IDE bus 34a through primary IDE controller 50. A secondary IDE controller 51 is shown as part of the bus control logic 40 (although it could be a separate circuit). The secondary IDE controller 51 controls any IDE device which is used in the modular bay 12.

Similarly, an external connector 52 is coupled to the telephony bus 34c. The external connector 52 allows the internal modem 33 of the computer 10 to be connected to a telephone jack. EXT_USED is a signal which is coupled from the external connector 52 to the bus control logic 40. EXT_USED is a logical high when the external connector is coupled to a jack and a logical low otherwise.

Power is supplied to the device 14 in the modular bay 12 through a transistor 54 having a control node coupled to MBPower pin of the bus control logic 40. When MBPower is at a high logic level, power flows from $V_{cc}$ to the device 14 in the modular bay 12. If the device 14 is a battery, it will couple to a separate connector (not shown) which works in conjunction with the primary battery.

In operation, the bus control logic 40 controls access between buses 34 and device 14 mounted in the modular bay 12. Bus control logic 40 controls buffers 36 through the enable pins of the buffers. At any one time, the modular bay device communicates with only one bus 34. When the device in the modular bay 12 is being switched, all buffers 36 will be disabled to prevent inadvertent data errors on any of the various buses.

The bus control logic 40 controls the buffers in response to two signals, ID and LATCH. In the preferred embodiment, four signal lines form the ID bus; these lines are referred to as the 4-bit ID signal. The ID signal identifies the type of device 14 in the modular bay 12. LATCH identifies when a device 14 is fully mounted in the modular bay 12.

For purposes of illustration, it is presumed that all four bit lines of the ID signal are connected to $V_{cc}$ via pull up resistors (not shown). Accordingly, when no device 14 is mounted in the modular bay 12, ID is set to a logical "1111". All devices 14, therefore, would have an ID in which at least one bit was a logical "0", which can be implemented by grounding one or more of the lines of cable 44 which make up the ID signal. When an initial connection is made between device 14 and the computer-side connector 38 (even before the device 14 is fully latched into the modular bay 12), the bus control logic 40 can identify the mounting of the device responsive to any one of the ID pins undergoing a transition from a logical "1" to a logical "0". Similarly, the bus control logic 40 can identify the complete removal of a device 14 from the modular bay 12 when all four ID bits are set to a logical "1".

It should be noted that while the ID signal uses four bits, not all of the bits are needed for the embodiment shown. The four bit signal allows future expansion of the number of devices which can be accommodated without hardware modification.

Figure 3:
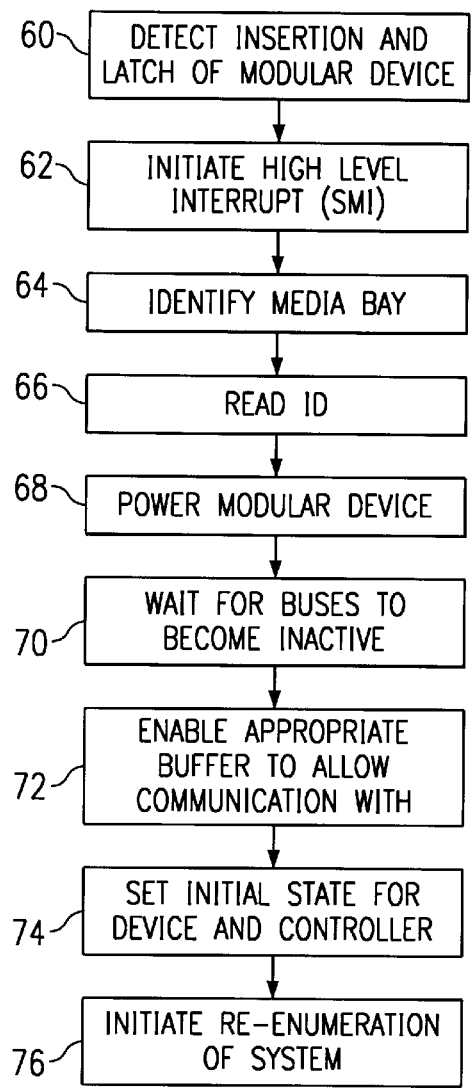
FIG. 3 illustrates a block diagram of a flow chart describing operation of the computer system responsive to the mounting of a device in the modular bay of the computer.

Operation of the computer system 10 in response to switching modular devices 14 is described in greater detail in connection with the flow chart of FIG. 3.

In block 60, the insertion and physical latching of the modular device 14 is detected. In the illustrated embodiment of FIG. 2, the bus control logic 40 detects the connection of a modular device 14 in the modular bay 12 when one or more bits of the ID signal transition from a logical high state to a logical low state. The bus control logic 40 detects the physical latching of the modular device 14 in the modular bay 12 responsive to a logical low state of the LATCH signal.

After detection of insertion and physical latching of the modular device in block 60, the bus control logic 40 initiates a high level interrupt in block 62. In the embodiment of an IBM compatible computer, the preferred embodiment is to generate an SMI (system management interrupt). The interrupt notifies the system software that a modular bay event has occurred (block 64).

Using an SMI, the system SMI handler, which is generally part of the system BIOS (basic input output system), will determine the nature of the interrupt. Code written for a modular bay event will perform the following functions. The type of device 14 placed in the modular bay 12 is identified responsive to the ID signal, which can be read from the bus control logic 40 (block 66). The SMI code powers the modular device by enabling the transistor 54 to pass current in block 68 and waits for the buses 36 to clear in block 70. Once the buses are clear, the SMI code instructs the bus control logic 40 to enable one of the buffer circuits 36 in block 72. Once the appropriate buffer circuit is enabled, the SMI code can initiate the device 14 and any necessary controller in block 74.

At this point the modular device is ready for operation on its associated bus 36. However, the operating system is not yet aware of the change in the configuration. In block 76, the SMI routine initiates a re-enumeration routine in the operating system, which detects the components in the system. WINDOWS 95, as an example, has a re-enumeration routine, which can be invoked at any time. The SMI handler then terminates.

After the re-enumeration routine is executed, the modular device is fully installed in the system. The state of the computer, including all applications, remains intact, so the user does not need to reload applications after a device change.

Figure 4:
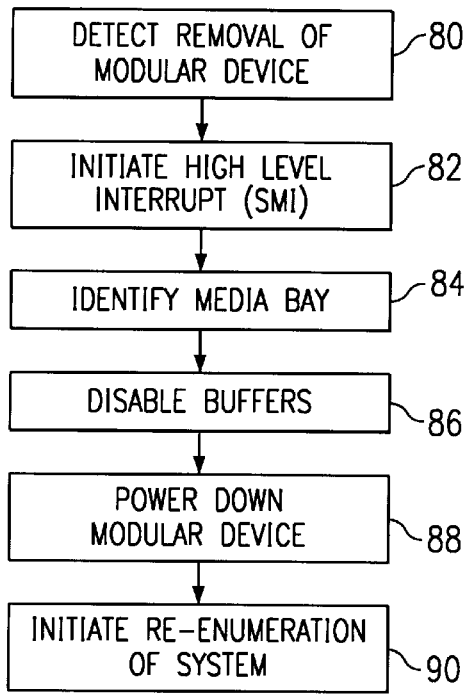
FIG. 4 illustrates a block diagram of a flow chart describing operation of the computer system responsive to the dismounting of a device in the modular bay of the computer.

FIG. 4 illustrates a flow chart of the operation of the computer system 10 during removal of a device 14 from the modular bay 10. In block 80, the bus control logic 40 detects device removal responsive to the transition of the LATCH signal from a logical low to a logical high voltage. When the LATCH signal transitions to a logical high voltage, the bus control logic initiates a SMI interrupt in block 82. The SMI handler routine determines the nature of the SMI interrupt as one indicating device removal from the modular bay 12 in block 84. The system software then instructs the bus control logic to disable all buffers 36, thereby stopping communication between the device 14 and the buses 34 (block 86). The bus control logic then powers down the device 12 by controlling transistor 54 (block 88).

In some cases, device removal could be inadvertent; therefore it may be desirable to initiate a screen to notify the user of device removal.

After the device 14 is powered down, the re-enumeration command is initiated to reset the configuration of the computer 10 (block 90) and the SMI routine terminates.

Because a user may change device while the computer is either powered-down or in a suspend state, and thus will not be alerted to the removal or insertion of a device 14 from the modular bay 12, the ID is checked whenever the computer 10 is powered or comes out of a suspend state. If the ID has changed, the steps of blocks 70–76 are executed.

Many notebook systems provide for a docking station. A docking station allows connection of the computer 10 to devices which may not be suitable for portable use. For example, the docking station may provide an interface and a physical connection to a local area network. It may also provide standard bus slots (such as Industry Standard Architecture (ISA) or Peripheral Connect Interface (PCI) slots) for the user to add peripheral cards, such as advanced video cards or sound cards. The system designer may chose to disable the modular bay (by disabling all buffers 36 and re-enumerating the system) while the computer 10 is connected to a docking station.

Figure 5:
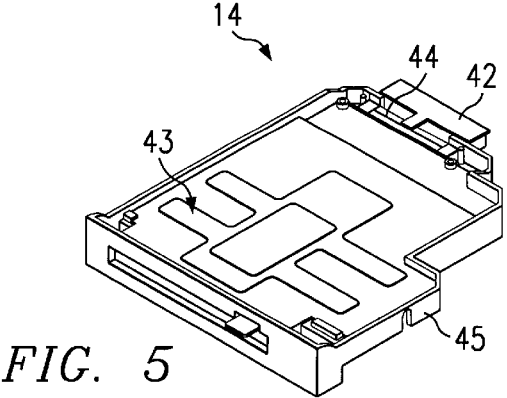
FIG. 5 illustrates an exploded view of a modular device for mounting in the modular bay.

FIG. 5 illustrates an exploded view of a modular device 14 (incorporating a floppy drive component in FIG. 5). The modular device 14 includes a housing 45, which contains a component 43 for mounting to the computer. The component 43 is coupled to connector 42 through cable 44.

The structure for the modular device 14, described above, allows a single connector type to be used with a plurality of component types, so that off-the-shelf components can be used in the housing 45 to provide many different functions for the modular bay 12. The connector 42 has a number of pins which is equal to or in excess of the number of bits in the largest bus 34 plus the number control signal bits for ID plus bits reserved for future expansion. The cable 44 provides the mechanism for mapping various connector types associated with the different components which may be used (for example, floppy drives and hard disks use different connector types) to the connector 42. Similarly, shared bus 37 will be connected to only one of the buses 36 at a time; therefore, shared bus 37 need only be as wide as the widest bus 36.

The computer system 10 provides significant advantages over the prior art. The shared bus structure shown FIG. 2 provides a great cost and space savings, since it greatly reduces the number of pins which would otherwise be necessary to accommodate various components, such as those discussed above. The reduction of the connector pin count (relative to individual connectors for each type of device supported by the modular bay) also provides an important mechanical benefit since the lower pin count reduces the total insertion and removal force needed to mate and separate the connectors 38 and 42.

The modular bay design allows off-the-shelf components to be quickly adapted to a notebook design, without a delay for designing an intelligent interface or a special form factor. Accordingly new technology can be quickly adapted to the computer 10. Further, the use of off-the-shelf parts significantly reduces the cost of optional devices 14.

The modular bay system described herein, for an IBM PC compatible computer, can be based on existing architectures with a modification to the system BIOS to modify the SMI handler to recognize modular bay events. Other type of computers, such as APPLE MACINTOSH could be supported with minor software modifications to react to modular bay events and re-enumerate the system.

The modular bay system could easily be modified to support a greater number of buses, using additional buffers for each new bus, or to support different buses.

Although the Detailed Description of the invention has been directed to certain exemplary embodiments, various modifications of these embodiments, as well as alternative embodiments, will be suggested to those skilled in the art. For example, the size of the buses could easily be changed to support the devices to be used in the modular bay 14. The computer 10 could be any type of computer, such as a desktop or different type of portable. The invention encompasses any modifications or alternative embodiments that fall within the scope of the Claims.

What is claimed is:

1. A computer system comprising:
   processing circuitry;
   a connector for receiving a device;
   a latching means for securing said device in said system;
   a switch responsive to said latching means;
   one or more buses coupled to said processing circuitry;
   buffer circuits associated with respective buses for selectively coupling a respective bus to said connector responsive to a control signal
   state of generating an interrupt to said processing circuitry from said receiving device; and
   logic responsive to said switch for generating control signals to each buffer circuit to couple said connector to one of said buses, wherein said processing circuitry re-enumerates the system responsive to said interrupt.

2. The computer system of claim 1, wherein said device provides a signal identifying said device and said control circuit selectively isolates one or more of said busses in response to said identifying signal.

3. The computer system of claim 1 and further comprising circuitry associated with each device for providing an identification signal for the device.

4. The computer system of claim 1 and further comprising circuitry for generating an interrupt responsive to connection of a device to said connector.

5. The computer system of claim 1 and further comprising circuitry for applying power to said device.

6. The computer system of claim 3 wherein said logic generates said control signals responsive to said identification signal.

7. A method of uncoupling a removable device to processing circuitry in a computer, comprising the steps of:
   detecting a physical disconnection of a device from the computer;
   generating an interrupt to said processing circuitry in response to said physical disconnection of said device;
   detecting a bus associated with the disconnected device;
   disabling a buffer disposed between said associated bus and said disconnected device; and
   re-enumerating the system responsive to said interrupt.

8. The method of claim 7 wherein said step of detecting a bus comprises the step of detecting an identification signal from said connected device.

9. The method of claim 7 wherein the step of detecting a physical disconnection of a device further comprises detecting the unlatching of the device securing means by the user.

* * * * *